UNITED STATES PATENT OFFICE.

WHITNEY B. JONES, OF PERTH AMBOY, NEW JERSEY, ASSIGNOR TO GENERAL BAKELITE COMPANY, OF NEW YORK, N. Y., A CORPORATION OF NEW YORK.

PHENOLIC CONDENSATION PRODUCT.

1,209,165.

Specification of Letters Patent. Patented Dec. 19, 1916.

No Drawing. Application filed March 5, 1913. Serial No. 752,230.

*To all whom it may concern:*

Be it known that I, WHITNEY B. JONES, a citizen of the United States, residing at Perth Amboy, in the county of Middlesex and State of New Jersey, have invented certain new and useful Improvements in Phenolic Condensation Products, of which the following is a specification.

This invention relates to a new composition of matter, the same containing a phenolic condensation product containing methylene groups and a cellulose ester or a mixture of such esters, and characterized by possessing a marked degree of flexibility and toughness.

The cellulose ester may be introduced at any stage of the reaction prior to the final hardening, and may be used in variable proportions, according to the effect desired. The reaction may be stopped or interrupted at any desired stage, and the composition may be mixed with fibrous or other filling materials for molding purposes, or may be dissolved in suitable solvents for the preparation of lacquers, enamels or similar coating compositions.

A preferred method of preparing the new composition is as follows:—212 grams of phenol or any of its homologues or mixtures thereof are warmed with 25 grams of commercial cellulose acetate. It is advantageous to add to the solution of phenol and cellulose acetate, either phenyl or cresyl acetate or other suitable phenol-ester, preferably in amount about equal to the quantity of cellulose acetate used. After the solution is complete, there are added 212 grams of commercial formaldehyde solution, and five cubic centimeters of strong ammonia solution. The mixture is then boiled for two to three hours until separation of water takes place, indicating the completion of the first stage of the reaction. Boiling is then interrupted and the water decanted, or the water may be otherwise removed. Heat is again applied and the boiling continued to distil off part or all of the residual water, the heating being continued until the mass has reached the desired consistence.

Obviously, instead of aqueous formaldehyde, or formaldehyde and ammonia, I may use any recognized equivalents thereof, such as hexamethylenetetramin and the like. Other cellulose esters, as cellulose formate, may be found capable of replacing the acetate, either wholly or in part.

If it is desired to prepare a mass for incorporation with filling materials, the composition is preferably removed from the boiling vessel and rapidly cooled.

If it is desired to produce a varnish or enamel, there is added to the hot mass, preferably in the boiling vessel, any suitable solvent or mixture of solvents, it being desirable but not in all cases essential that the boiling-point of at least one of the solvents used should be higher than that of water. As such solvent, I prefer to use tetrachlorethane, but any other suitable solvent or mixture of solvents may be employed. After addition of the solvent, the liquid is well stirred, the distillation continued to remove traces of water and the mass thereafter cooled, yielding a clear, thick liquid varnish or enamel. This varnish may be further diluted to any desired consistence by appropriate solvents, and may, if desired, have added thereto suitable pigments or filling materials for the production of certain protective coatings or enamels.

When applied to metallic or other surfaces and properly baked, this lacquer forms a hard, highly-flexible and very tough coating which resists the action of organic solvents, dilute acids, etc. It may likewise be applied to absorbent materials or surfaces with excellent results.

The expression "phenolic condensation product", as employed in the claims, is intended to include such condensation products of phenol and formaldehyde or their equivalents as have been rendered insoluble by polymerization, and also such condensation products as are soluble and fusible, whether capable or not of transformation by simple heating into insoluble products.

The expressions "cellulose ester" and "cellulose acetate" as herein employed are intended to include any definite cellulose esters or the usual commercial products containing a mixture of such esters.

I claim:

1. As a new composition of matter, a liquid coating composition containing a phenolic condensation product and a cellulose ester, in conjunction with a solvent having a boiling-point higher than that of water.

2. As a new composition of matter, a coating composition containing a phenolic condensation product and a cellulose ester, in conjunction with a solvent containing a chlorinated hydrocarbon.

3. As a new composition of matter, a coating composition containing a phenolic condensation product and a cellulose ester, in conjunction with a chlorinated solvent having a boiling-point higher than that of water.

4. As a new composition of matter, a coating composition containing a phenolic condensation product and a cellulose ester, in conjunction with tetrachlorethane.

5. As a new composition of matter, a phenolic condensation product containing a cellulose ester and an ester of a phenolic body.

6. As a new composition of matter, a phenolic condensation product containing cellulose acetate and an acetate of a phenolic body.

7. As a new composition of matter, a coating composition containing in solution a phenolic condensation product, cellulose acetate, and an acetate of a phenolic body.

8. As a new composition of matter, a liquid coating composition containing a phenolic condensation product, a cellulose ester, an ester of a phenolic body, and a suitable solvent.

9. As a new composition of matter, a liquid coating composition containing a phenolic condensation product, a cellulose ester, an ester of a phenolic body, and tetrachlorethane.

In testimony whereof I affix my signature in presence of two witnesses.

WHITNEY B. JONES.

Witnesses:
 LOUIS M. ROSSI,
 WILLARD L. BONNER.